(12) United States Patent
Derginer et al.

(10) Patent No.: US 12,429,870 B1
(45) Date of Patent: *Sep. 30, 2025

(54) MARINE STEERING SYSTEM AND METHOD

(71) Applicant: Brunswick Corporation, Mettawa, IL (US)

(72) Inventors: Matthew E. Derginer, Butte des Mort, WI (US); John O. Scherer, III, Oshkosh, WI (US); Roger W. Schreiber, Fremont, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,783

(22) Filed: Apr. 2, 2024

Related U.S. Application Data

(63) Continuation of application No. 17/824,071, filed on May 25, 2022, now Pat. No. 12,007,771, which is a continuation of application No. 16/535,946, filed on Aug. 8, 2019, now Pat. No. 11,372,411.

(51) Int. Cl.
*G05D 1/00* (2024.01)
*B63H 25/38* (2006.01)

(52) U.S. Cl.
CPC ......... *G05D 1/0206* (2013.01); *B63H 25/381* (2013.01)

(58) Field of Classification Search
CPC .......... G05D 1/00; G05D 1/0206; G05D 1/20; G05D 1/22; G05D 1/40; G05D 1/49; G05D 1/60; G05D 2109/34; B63H 25/381
See application file for complete search history.

(56) References Cited

U.S. PATENT DOCUMENTS

| | | | |
|---|---|---|---|
| 4,759,732 A | 7/1988 | Atsumi | |
| 6,354,237 B1 | 3/2002 | Gaynor et al. | |
| 6,583,728 B1 | 6/2003 | Staerzl | |
| 6,884,130 B2 | 4/2005 | Okabe | |
| 6,910,927 B2 | 6/2005 | Kanno | |
| 6,923,136 B1 | 8/2005 | D'Alessandro | |
| 6,994,046 B2 | 2/2006 | Kaji et al. | |
| 7,001,230 B2 | 2/2006 | Saito | |
| 7,059,922 B2 | 6/2006 | Kawanishi | |
| 7,128,625 B2 | 10/2006 | Saito | |
| 7,188,581 B1 | 3/2007 | Davis et al. | |

(Continued)

FOREIGN PATENT DOCUMENTS

| | | |
|---|---|---|
| CA | 2279165 | 1/2001 |
| CA | 2282064 | 1/2001 |

(Continued)

*Primary Examiner* — Aaron L Troost
(74) *Attorney, Agent, or Firm* — Andrus Intellectual Property Law, LLP

(57) ABSTRACT

A method of controlling steering of a marine vessel includes receiving a steering input from an operator-controlled steering input device, determining a desired turn rate for the marine vessel and a desired roll angle for the marine vessel based on the steering input, and controlling a steering angle of at least one trimmable propulsion device based on the desired turn rate and controlling a trim deployment of a pair of trim tabs and/or the trimmable propulsion device based on the desired roll angle so as to steer the marine vessel according to the steering input.

21 Claims, 6 Drawing Sheets

(56) References Cited

U.S. PATENT DOCUMENTS

| | | |
|---|---|---|
| 7,243,009 B2 | 7/2007 | Kaji |
| 7,389,165 B2 | 6/2008 | Kaji |
| 7,438,013 B2 | 10/2008 | Mizutani |
| 7,481,688 B2 | 1/2009 | Kobayashi |
| 7,506,599 B2 | 3/2009 | Mizutani |
| 7,527,537 B2 | 5/2009 | Mizutani |
| 7,533,624 B2 | 5/2009 | Mizutani |
| 7,540,253 B2 | 6/2009 | Mizutani |
| 7,674,145 B2 | 3/2010 | Okuyama et al. |
| 7,736,204 B2 | 6/2010 | Kaji |
| 7,844,374 B2 | 11/2010 | Mizutani |
| 7,930,986 B2 | 4/2011 | Mizutani |
| 7,972,189 B2 | 7/2011 | Urano |
| 8,011,981 B2 | 9/2011 | Mizutani |
| 8,046,121 B2 | 10/2011 | Mizutani |
| 8,376,793 B2 | 2/2013 | Chiecchi |
| 8,622,012 B2 | 1/2014 | Olofsson |
| 8,688,298 B2 | 4/2014 | Mizutani et al. |
| 8,831,802 B2 | 9/2014 | Mizutani et al. |
| 8,838,305 B2 | 9/2014 | Mizutani |
| 9,032,898 B2 | 5/2015 | Widmark |
| 9,033,752 B2 | 5/2015 | Takase |
| 9,150,294 B2 | 10/2015 | Ito et al. |
| 9,183,711 B2 | 11/2015 | Fiorini et al. |
| 9,278,740 B1 * | 3/2016 | Andrasko ............ G05D 1/0875 |
| 9,355,463 B1 | 5/2016 | Arambel et al. |
| 9,376,188 B2 | 6/2016 | Okamoto |
| 9,598,160 B2 | 3/2017 | Andrasko et al. |
| 9,615,006 B2 | 4/2017 | Terre et al. |
| 9,729,802 B2 | 8/2017 | Frank et al. |
| 9,733,645 B1 | 8/2017 | Andrasko et al. |
| 9,734,583 B2 | 8/2017 | Walker et al. |
| 9,969,473 B2 | 5/2018 | Okamoto |
| 9,996,083 B2 | 6/2018 | Vojak |
| 10,055,648 B1 | 8/2018 | Grigsby et al. |
| 10,106,238 B2 | 10/2018 | Sidki et al. |
| 10,191,153 B2 | 1/2019 | Gatland |
| 10,281,917 B2 | 5/2019 | Tyers |
| 10,322,778 B2 | 6/2019 | Widmark et al. |
| 10,336,426 B2 | 7/2019 | Naito et al. |
| 10,338,800 B2 | 7/2019 | Rivers et al. |
| 10,431,099 B2 | 10/2019 | Stewart et al. |
| 10,444,349 B2 | 10/2019 | Gatland |
| 10,464,647 B2 | 11/2019 | Tokuda |
| 10,625,837 B2 | 4/2020 | Ichikawa et al. |
| 12,007,771 B1 * | 6/2024 | Derginer .............. G05D 1/0206 |
| 2006/0217011 A1 | 9/2006 | Morvillo |
| 2009/0171520 A1 | 7/2009 | Kaji et al. |
| 2010/0094491 A1 * | 4/2010 | Oehlgrien ................ G05D 1/49 73/178 R |
| 2010/0138083 A1 | 6/2010 | Kaji |
| 2016/0214534 A1 | 7/2016 | Richards et al. |
| 2017/0139426 A1 | 5/2017 | Ito et al. |
| 2017/0300056 A1 | 10/2017 | Johnson et al. |
| 2018/0259338 A1 | 9/2018 | Stokes et al. |
| 2018/0259339 A1 | 9/2018 | Johnson et al. |
| 2019/0251356 A1 | 8/2019 | Rivers |
| 2019/0258258 A1 | 8/2019 | Tyers |
| 2020/0108902 A1 | 4/2020 | Wong et al. |
| 2020/0130797 A1 | 4/2020 | Mizutani |
| 2020/0324864 A1 | 10/2020 | Inoue |
| 2020/0331572 A1 | 10/2020 | Inoue |
| 2020/0391838 A1 | 12/2020 | Inoue et al. |
| 2020/0391840 A1 | 12/2020 | Inoue et al. |
| 2021/0086876 A1 | 3/2021 | Inoue et al. |
| 2021/0107617 A1 | 4/2021 | Nakatani |
| 2021/0141396 A1 | 5/2021 | Kinoshita |
| 2021/0147053 A1 | 5/2021 | Motose et al. |
| 2021/0155333 A1 | 5/2021 | Mizutani |
| 2021/0179244 A1 | 6/2021 | Mizutani |
| 2021/0197940 A1 | 7/2021 | Takase |
| 2021/0197944 A1 | 7/2021 | Takase |
| 2021/0291943 A1 | 9/2021 | Inoue et al. |

FOREIGN PATENT DOCUMENTS

| | | |
|---|---|---|
| CN | 102015437 | 10/2013 |
| CN | 107810139 | 8/2019 |
| EP | 1477402 | 1/2008 |
| EP | 1535833 | 12/2009 |
| EP | 2536622 | 12/2012 |
| EP | 1923307 | 2/2013 |
| EP | 1923309 | 5/2013 |
| EP | 1923308 | 6/2013 |
| EP | 2813423 | 8/2016 |
| EP | 2250077 | 2/2018 |
| EP | 2703279 | 6/2018 |
| EP | 3298302 | 10/2019 |
| EP | 3643597 | 4/2020 |
| EP | 3498589 | 7/2020 |
| EP | 3805088 | 4/2021 |
| EP | 3808646 | 4/2021 |
| EP | 1770007 | 5/2021 |
| EP | 3842332 | 6/2021 |
| EP | 3842333 | 6/2021 |
| JP | 06820274 | 1/2021 |
| SE | 540567 | 10/2018 |
| WO | WO 2009113923 | 9/2009 |
| WO | WO 2011099931 | 8/2011 |
| WO | WO 2016188963 | 12/2016 |
| WO | WO 2016209767 | 12/2016 |
| WO | WO 2017167905 | 10/2017 |
| WO | WO 2018162933 | 9/2018 |
| WO | WO 2018183777 | 10/2018 |
| WO | WO 2018201097 | 11/2018 |
| WO | WO 2018232376 | 12/2018 |
| WO | WO 2019096401 | 5/2019 |
| WO | WO 2019126755 | 6/2019 |
| WO | WO 2019157400 | 8/2019 |
| WO | WO 2019201945 | 10/2019 |

* cited by examiner

MARINE STEERING SYSTEM AND METHOD

CROSS REFERENCE TO RELATED APPLICATION

This application is a continuation of U.S. patent application Ser. No. 17/824,071, filed May 25, 2022, which is a continuation of U.S. patent application Ser. No. 16/535,946, filed Aug. 8, 2019, all of which applications are incorporated herein by reference in their entireties.

FIELD

The present disclosure relates to systems and methods for steering a marine vessel, including systems and methods for controlling yaw, roll, and pitch of a marine vessel.

BACKGROUND

Each of the following patents is hereby incorporated herein by reference in its entirety.

U.S. Pat. No. 6,354,237 discloses a trim tab control system in which four buttons or switches are provided for the marine operator in which the operator can select to raise the bow, raise the stern, raise the port side of the boat, or raise the stern side of the boat in relative terms, and the system will automatically position the trim tabs to most efficiently achieve the operator's demanded change in position of the marine vessel.

U.S. Pat. No. 6,583,728 discloses a trim tab monitoring circuit which receives a signal that is representative of a voltage potential across a stator winding of a motor which is attached to the trim tab. This signal is passed through a high pass filter to remove the DC component of the signal, amplified, and passed through a low pass filter to remove certain high frequencies components of the signal. A zero crossing detector is used to discern individual pulses which are then received by a counter that provides a single output pulse for a predetermined number of input pulses. The series of output pulses from the counter are conditioned and, in conjunction with a direction sensor, provided to an up/down counter controller that provides digital signals to a signal output circuit. The signal output circuit provides a DC voltage output to a display and the DC output voltage is representative of the position of the trim tab.

U.S. Pat. No. 7,188,581 discloses a marine drive and a marine vessel and drive combination having a trim tab with a forward end pivotally mounted to a marine propulsion device.

U.S. Pat. No. 9,278,740 discloses a system for controlling an attitude of a marine vessel having first and second trim tabs that includes a controller having vessel roll and pitch control sections. The pitch control section compares an actual vessel pitch angle to a predetermined desired vessel pitch angle and outputs a deployment setpoint that is calculated to achieve the desired pitch angle. The roll control section compares an actual vessel roll angle to a predetermined desired vessel roll angle, and outputs a desired differential between the first and second deployments that is calculated to maintain the vessel at the desired vessel roll angle. When the controller determines that the magnitude of a requested vessel turn is greater than a first predetermined threshold, the controller decreases the desired differential between the first and second deployments, and accounts for the decreased desired differential deployment in its calculation of the first and second deployments.

U.S. Pat. No. 9,598,160 discloses a system and method for controlling a trim device that positions a trimmable marine apparatus with respect to a marine vessel. The trim system is operated in an automatic mode, in which a controller sends signals to actuate the trim device automatically as a function of vessel or engine speed, or a manual mode, in which the controller sends signals to actuate the trim device in response to commands from an operator input device. An operating speed of the propulsion system is determined. When the operating speed has crossed a given operating speed threshold, the trim system is subsequently operated in the automatic or manual mode depending on whether the operating speed increased or decreased as it crossed the operating speed threshold and whether the trim system was operating in the automatic or manual mode as the operating speed crossed the operating speed threshold.

U.S. Pat. No. 9,733,645 discloses a system and method for controlling handling of a marine vessel having a steerable component that is steerable to a plurality of positions to vary a direction of movement of the vessel. A controller is communicatively connected to an actuator of the steerable component and a user input device provides to the controller an operator-initiated steering command to steer the steerable component to one of the plurality of positions. A sensor provides to the controller an indication of an undesired course change of the marine vessel. The controller has a vessel direction control section that outputs a command to the actuator to change a position of the steerable component from the one of the plurality of positions so as to automatically counteract the undesired course change. The vessel direction control section is active only when the operator-initiated steering command is less than or equal to a predetermined threshold.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a steering system on a marine vessel includes at least one propulsion device configured to propel the marine vessel, a steering actuator that rotates the at least one propulsion device to effectuate steering, at least one trim device coupled to the marine vessel and moveable to adjust a running angle thereof, and at least one trim actuator configured to move the trim device so as to effectuate adjustment of the running angle. A control system is configured to determine a desired roll angle and at least one of a desired turn rate and a desired turn angle for the marine vessel based on a steering instructions. In various embodiments, the steering instruction may be an operator input at a steering input device, such as a steering wheel, or may be an output by an autonomous navigation system. The control system then controls the steering actuator to the rotate the at least one propulsion device based on the desired turn rate and/or the desired turn angle, and to control the trim actuator to move the at least one trim device based on the desired roll angle so as to effectuate the steering instruction.

In certain examples, the system is further configured to determine and control at least one of a trim position of the propulsion device and a rotational speed of the propulsion device to effectuate the desired turn rate and/or the desired roll angle. In one such example, the control system is further configured to determine at least one of a trim position of the propulsion device and a rotational speed of the propulsion device to effectuate the desired turn rate and/or the desired roll angle without exceeding a side force limit.

In one embodiment, a method of controlling steering of a marine vessel includes receiving a steering output from an operator-controlled steering input device and then determining a desired turn rate for the marine vessel and a desired roll angle for the marine vessel based on the steering input. A steering angle of at least one propulsion device is then controlled based on the desired turn rate and a trim deployment of each of a pair of trim tabs is also controlled based on the desired roll angle so as to steer the marine vessel according to the steering input.

In certain examples, the method further includes controlling at least one of a trim position of the propulsion device and a rotational speed of the propulsion device to effectuate the desired turn rate and/or the desired roll angle.

Another embodiment of a method of controlling the marine vessel includes calculating a desired roll angle for a marine vessel based on the desired turn, and then determining a trim deployment of a trim device based on the desired roll angle. The desired turn rate may be calculated based on a steering input from an operator-controlled steering input device, such as a steering while, for example. Alternatively, the desired turn rate may be an output of an autonomous navigation system. The steering angle of at least one propulsion device is then controlled based on the desired turn rate. One or more trim actuators are controlled to move the at least one trim device to the desired trim deployment in order to effectuate the desired turn rate.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
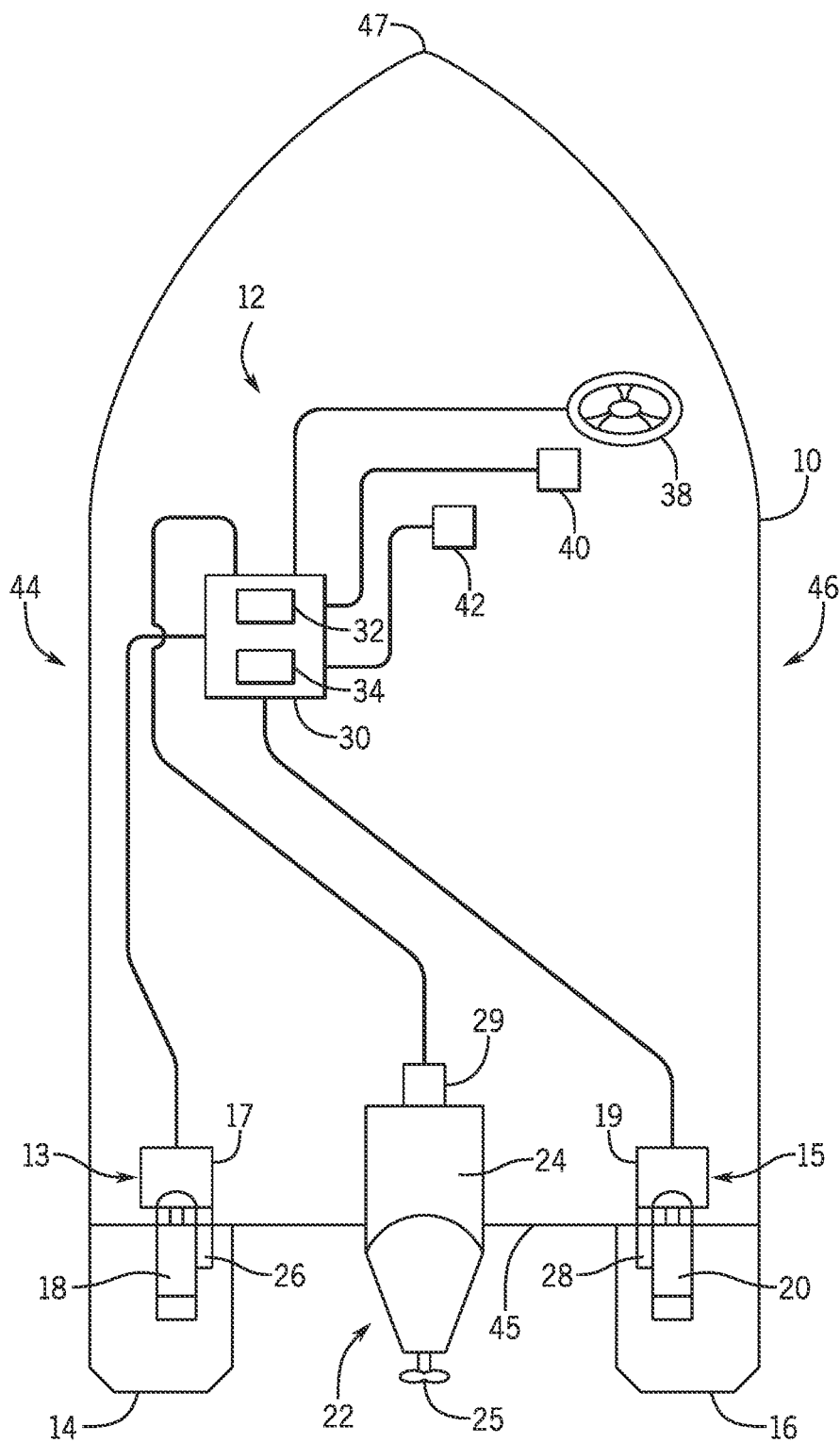
FIG. 1 illustrates a steering control system according to one embodiment of the present disclosure.

The present inventors have recognized that current steering systems and methods for marine vessels do not utilize or integrate trim devices to assist in turning the marine vessel. The inventors further recognized that trim devices can be utilized and integrated within the steering system in order to make turning the marine vessel more efficient, faster, and safer. The inventors have recognized that moving propulsion devices, especially large outboard motors, requires significant energy consumption because propulsion devices, especially outboard motors, are heavy and large. Moreover, shifting that much weight quickly to provide fast steering response can cause vibration and even induce unwanted roll of the marine vessel. Correspondingly, the inventors have recognized that trim tabs can be utilized to reduce the need for fast steering response at the propulsion device, which can optimize control motion by requiring less inputs for turn actuation, and thereby improve maneuverability and turn responsiveness of a marine vessel. This reduces the capacity and speed requirements of engine steering actuators for providing responsive steering because the trim devices, such as trim tabs, can be utilized to initiate turn of the marine vessel in response to steering inputs.

Along these lines, the inventors have recognized that a trim system, such as a trim tab system, needs to provide a sufficient response frequency in order to control vessel roll and pitch precisely and quickly enough for purposes of controlling steering of a marine vessel. For example, the inventors have recognized that the trim tab system on the marine vessel preferably is actuatable at a response rate that is faster than a natural roll frequency of the marine vessel. Thereby, the trim tabs can be used to effectively control roll of the marine vessel, such as at a sufficient rate to instigate a turn and/or to eliminate unwanted roll—e.g., so as to mitigate or prevent chine walk. In certain embodiments, it is desirable for a trim system, such as a trim tab system, to be actuatable at a response rate that is an order of magnitude faster than the natural roll frequency of the marine vessel. To provide just one example, where the natural roll frequency of a marine vessel is one hertz (Hz), it may be desirable to provide a trim system with a response frequency of two Hz, or even three Hz.

The inventors have recognized that integrating trim into steering requires a higher frequency response than needed or utilized for classic boat stability. Current trim systems, such as those utilizing trim tabs, are designed to manage attitude of a marine vessel operating at high speeds. These trim systems are typically controlled by separate operator-controlled user input devices where a user controls each trim device, such as each trim tab, separately in order to adjust vessel attitude. Such trim tab control systems, which are separate from engine and/or vessel steering systems, are too slow to accomplish the steering control disclosed herein. For example, current trim tab systems typically have a frequency response on the order of 0.5 to 0.8 Hz, which is too slow for controlling the tabs to effectuate steering.

The inventors have further recognized that current steering systems can be made safer by integrating and controlling vessel roll in conjunction with vessel turn rate in order to minimize or eliminate side forces. Current steering systems provide "lock-to-lock" turn control where steering input, such as steering wheel rotation, is directly correlated to steering position or steering angle of a propulsion device with respect to the marine vessel. Thus, current steer-by-wire systems are calibrated to set the number of turns of the wheel that results in turning the engine to full authority. The calibration of number of wheel turns is typically set to provide a balance between steering gain at high speeds and having to turn the wheel too many times at low speeds. However, this steering regime can cause a dangerous situation at high speeds, where vessel turn rate in response to steering wheel turn is at a maximum. Operators can accidentally induce a turn that is too aggressive and results in excessive side force, which can lead to skipping the boat sideways and/or causing passengers or the operator to fall overboard.

The inventors have recognized that integrating trim tabs into a steering control system can yield a system where vessel roll can be controlled during a turn to minimize or eliminate side forces felt by people on the marine vessel. Namely, vessel roll can be coordinated with the instructed turn so that the vessel absorbs the centripetal forces and the people on the vessel only perceive vertical, or downward, forces with respect to the marine vessel. Furthermore, the inventors have recognized that the steering system can be configured to limit side forces, such as based on a maximum roll angle of the marine vessel, a maximum deflection capability of the trim system, and other roll-limiting factors. Thereby, in one embodiment, the steering system is configured to prevent turning or steering the propulsion devices at a rate and/or steering angle that will generate excessive lateral side forces, or side forces greater than a threshold lateral side force. Thus, the steering control system can prevent uncomfortable or dangerous situations, such as where operators or passengers on a marine vessel are thrown overboard due to overly aggressive vessel turn. As described herein, the disclosed turn rate command model and roll rate command model can be scheduled based on vessel speed to create a constant turn rate, or at least a substantially constant turn rate such that the operator perception is that the vessel turn response per degree of wheel deflection is constant regardless of vessel speed, or scheduled as a function of vessel speed to provide appropriate/safe handling qualities.

The disclosed system correlates steering input with either vessel turn rate or vessel roll, and controls steering accordingly. In certain embodiments, the steer-by-wire steering control system that integrates propulsion steering and trim device control implements algorithms utilizing steering input (e.g. from a steering wheel), engine demand, and in some cases, motion and/or navigation sensors (GPS, IMU, INS, etc.). Thereby roll and turn rate are controlled in a coordinated way, providing comprehensive, responsive, and safe steering control and also allowing stabilization of disturbances in the frequency domain of the vessel roll and pitch, such as to prevent or eliminate chine walk.

FIG. 1 illustrates a marine vessel 10 having a steering control system 12 that is enabled for coordinated control of both roll and yaw of the marine vessel 10. The marine vessel 10 has first and second trim tabs 14, 16. Although in the example shown the trim tab 14 is a port trim tab and the trim tab 16 is a starboard trim tab, the orientation of the trim tabs 14, 16 and their designation as first and second need not correspond. In other words, the port trim tab need not be the first trim tab, and the starboard trim tab need not be the second trim tab, i.e., the designations as "first" and "second" could be reversed and are merely provided for convenience of discussion. The trim tab 14 is actuated by a trim tab actuator 13 and the trim tab 16 is actuated by a trim tab actuator 15.

Marine vessel 10 includes a propulsion device 22, which may be, for example, an outboard drive, a pod drive, inboard drive, or other type of stern drive. The propulsion device 22 has an engine 24 that turns a propeller 25 to produce a thrust to propel the marine vessel 10 in a generally forward direction. A person of ordinary skill in the art will understand in view of the present disclosure that alternatively and equivalently the propulsion device(s) 24 may comprise an electric motor or other powerhead that causes rotation of the propeller 25. At least some portions of the propulsion device 22 is capable of being rotated around a generally vertical axis in response to commands from a steering wheel 38 or autonomous navigation controller 40. In the instance of an outboard drive, the entire drive may be rotated with respect to a steering axis. In the instance of a stern drive, the outer drive portion that includes the propeller may be rotated. Rotation of the propulsion device(s) 22 is effectuated by one or more steering actuator(s) 29. Steering actuator 29 may include an electric motor, hydraulic motor, and/or an electric over hydraulic system. In certain embodiments, the propulsion device(s) may also be trimmable, and such trim may be actuated from separate actuators from the trim activators for the trim tabs 14, 16. Also included on the marine vessel 10 are trim tab sensors 26, 28, for sensing a position of the trim tabs 14, 16. For example, these sensors 26, 28 may be Hall Effect sensors. Likewise, sensors may be associated with the steering actuator(s) 29 to sense the actual steering position(s) of the propulsion device(s), as is standard, such as to provide feedback for steering control.

The steering system 12 further includes a control system 30 having both a roll controller 32 and a turn rate controller 34. The control system 30 has a memory and a programmable processor. As is conventional, the processor can be communicatively connected to a computer readable medium that includes volatile or nonvolatile memory upon which computer readable code is stored. The processor can access the computer readable code and the computer readable medium upon executing the code carries out the functions as described herein. It should be understood that the roll controller 32 and turn rate controller 34 could be implemented as two separate control sections, or algorithms, implemented by a single control module (as shown herein for exemplary purposes), or could instead be implemented on separate control modules that are communicatively connected.

In the example shown, the control system 30 are connected to the trim tab actuators 13 and 15, one or more propulsion devices 22, and the trim tab sensors 26, 28 via wired connections. However, it should be understood that these devices could be connected in other ways, such as, for example, wirelessly or through a wired network such as a CAN bus. In the example shown, the steering wheel 38, the autonomous navigation controller 40, and a pitch/roll sensor 42 are also connected to the control system 30. In one example, the pitch/roll sensor 42 is an attitude and heading reference system (AHRS) that provides 3D orientation of the marine vessel 10 by integrating gyroscopic measurements, accelerometer data, and magnetometer data. A gyroscope, motion reference unit (MRU), tilt sensor, inertial measurement unit (IMU), or any combination of these devices could instead be used. In another example, two separate sensors are provided for sensing pitch and roll of the marine vessel 10.

Trim tabs 14 and 16 are connected to the transom 45 of the marine vessel 10. In other examples, the trim tabs may be under mount tabs. These trim tabs 14 and 16 are designed to pivot about a hinged connection point so as to change the dynamics on the underside of the hull. To put the bow 47 of the marine vessel 10 down, both trim tabs 14 and 16 are moved down to the maximum lowered position, or maximum deployment position. For low power or trailing operation, the trim tabs 14 and 16 are lifted to the maximum raised position, or zero deployment position. Turn tabs 14 and 16 are also individually actuatable such that each trim tab 14 and 16 be moved separately from the other (e.g., only one trim tab may be moved), to different trim positions, and trimmed in different directions. In certain embodiments, the trim devices may be elements other than trim tabs 14 and 16, such as trim deflectors or interceptors or other hull-geometry-shaping device attached to the bottom of the transom or bottom of the hull of the marine vessel. The trim actuators 13 and 15 may likewise be any device or system configured for effectuating movement of the trim devices in accordance with the methods described herein.

As mentioned, the marine vessel 10 is provided with first and second trim tab actuators 13, 15. The first actuator 13 may comprise a hydraulic cylinder 18 connected to an electro-hydraulic motor or pump 17. The hydraulic cylinder 18 operates to rotate the first trim tab 14 to the minimum deployment or zero degree position and the maximum deployment position and to maintain the trim tab 14 in any desired position. Similarly, the second actuator 15 may comprise a hydraulic cylinder 20 connected to an electro-hydraulic motor or pump 19. The hydraulic cylinder 20 operates to rotate the second trim tab 16 to the minimum and maximum deployment positions and to maintain the trim tab 16 in any desired position therebetween. Other types of actuators 13, 15 could be used in other examples.

As described above, the actuators 13, 15 are sufficiently responsive to provide the optimized steering control and maneuverability as described herein. Accordingly, the trim actuators 13, 15 have a sufficiently fast response rate to provide responsive steering control and to control and maintain roll position of the marine vessel in accordance with the steering input. Thus, in one embodiment, the trim actuators 13, 15 are capable of controlling the turn devices, e.g. trim tabs 14, 16, at a response rate that is faster than the natural roll frequency of the marine vessel. To provide one example, the trim actuators 13, 15 have a frequency response that is greater than one Hz, and in certain examples may be greater than two Hz or three Hz. Thereby, the trim tabs 14, 16, or other trim devices, can be actuated to coordinate roll control with vessel steering, and to eliminate or avoid chine walk. For example, the frequency response of the trim actuation system must be faster than the natural roll frequency that the vessel 10 would roll at when chine walk is induced. More specifically, the trim actuators can be controlled to counteract the roll frequency of the marine vessel to prevent chine walk when the marine vessel is being steered straight ahead, and thus roll is not intended as part of a turn maneuver.

Figure 2:
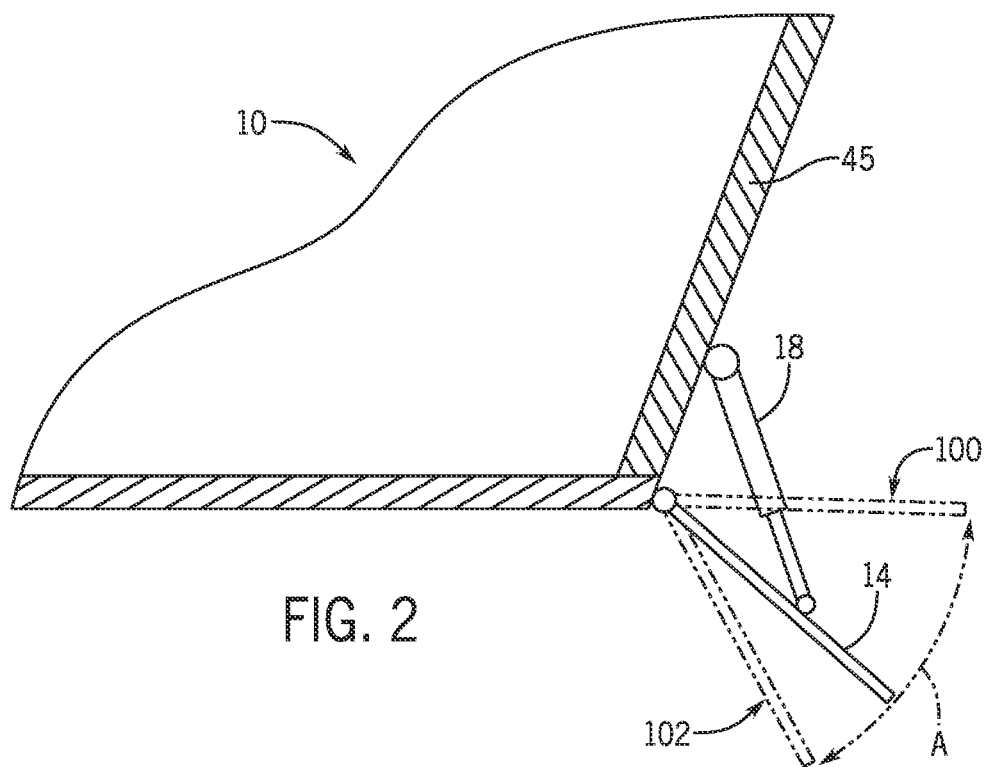
FIG. 2 illustrates a side view of a trim tab and various positions to which the trim tab may be actuated.

Those having ordinary skill in the art will appreciate that the trim tabs 14 and 16 can be actuated to different deployments with respect to the transom 45 of the marine vessel 10. With reference to FIG. 2, for example, the trim tabs 14, 16 can be deployed from 0% deployment where they project generally horizontally (position 100), to 100% deployment, where they lie at a calibrated maximum angle A with respect to horizontal (position 102). The calibrated maximum angle A at which the trim tabs 14, 16 are considered 100% deployed can vary based on the specifics of the marine vessel 10 to which the trim tabs 14, 16 are attached. In accordance with the nomenclature provided herein, the trim tabs 14, 16 are less deployed when they lie closer to horizontal (position 100), and are more deployed when they extend at increasingly greater angles to horizontal.

Figure 3:
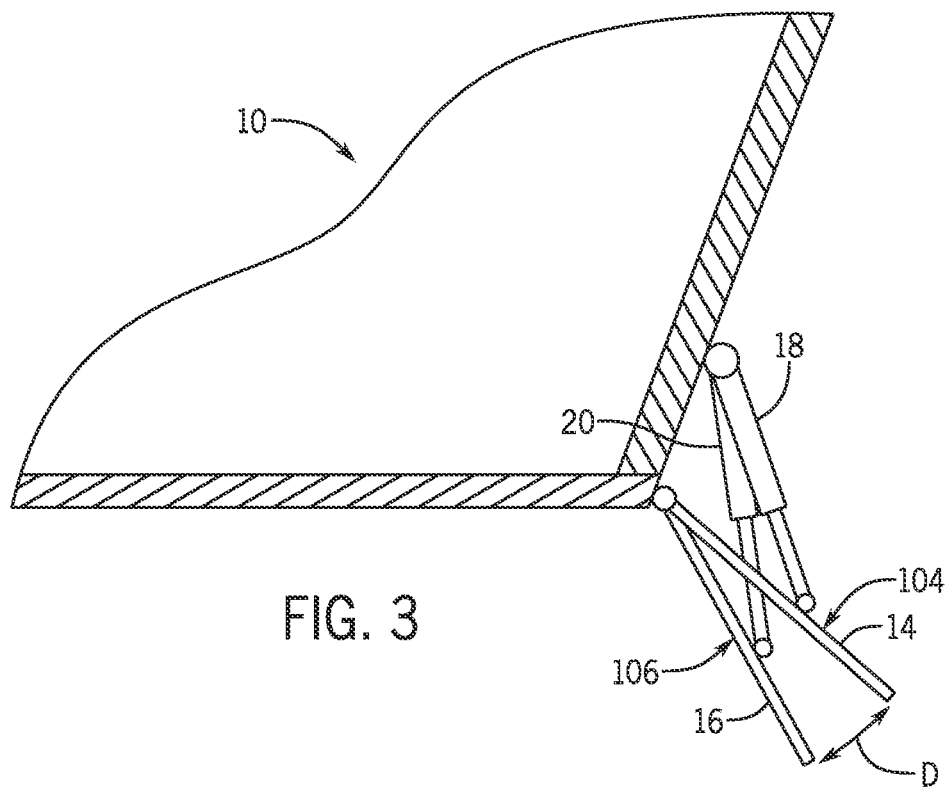
FIG. 3 illustrates a side view of first and second trim tabs having differential deployment.

At times, it is desirable to deploy one of the trim tabs 14, 16 more or less than the other of the trim tabs 14, 16 in order to affect roll of the marine vessel 10. In doing so, the trim tabs 14, 16 will have a "differential" in their deployments, in that one of the trim tabs will be deployed at a value from 0 to 100% that is different than the value of deployment (from 0 to 100%) of the other of the trim tabs. For example, referring to FIG. 3, trim tab 14 might be at position 104, while trim tab 16 might be at position 106, creating a differential deployment of D. This differential deployment D can, for example, be quantified in terms of a percent deployment difference or as an angular difference, it being understood that the units by which deployment is measured are not limiting on the scope of the present disclosure. Current trim tab systems often utilize differential deployment of the trim tabs 14, 16 to correct listing of the vessel to either the starboard or port sides. If, for example, a strong wind is blowing from the port side 44 of the marine vessel 10, causing the marine vessel to list to starboard 46. In response, the control system 30 may automatically deploy the trim tab 16 on the starboard side 46 of the marine vessel 10 such that is more deployed than the trim tab 14 on the port side 44. Deploying the trim tab 16 more than the trim tab 14 creates a greater upwardly directed force under the starboard side 46 of the marine vessel 10, due to an increased angle of attack of water on the trim tab 16. The greater force caused by the differential deployment lifts the starboard side 46 of the marine vessel 10 and rolls the vessel to port 44, thereby countering the list to starboard 46.

At other times, it may be desirable to purposely pitch the marine vessel 10 in a way that the marine vessel 10 would not otherwise be pitched were it not for deployment of the trim tabs 14, 16. For instance, if the marine vessel 10 is pitching fore or aft due to the effect of wind or waves, it may be desirable to deploy the trim tabs 14, 16 in a manner to counter this externally induced pitch. For example, if the marine vessel 10 is pitching in a backward direction, it may be desirable to increase the deployment of both trim tabs 14, 16 in order to increase the upward force on the stern (provided by the increased angle of the trim tabs) and thereby lower the bow 47 of the marine vessel 10. One example of when this type of control is needed is when the marine vessel 10 switches from operating at maximum speed, with tabs fully up, to barely planing speed. After the operator reduces the throttle, the pitch controller will increment the tabs to a more deployed state so as to keep the bow of the vessel down. Generally, in order to counter only externally induced pitch of a marine vessel 10, it is not necessary to differentially deploy the trim tabs 14, 16; rather, both trim tabs 14, 16 may be deployed to the same setpoint deployment, measured from horizontal.

Figure 4:
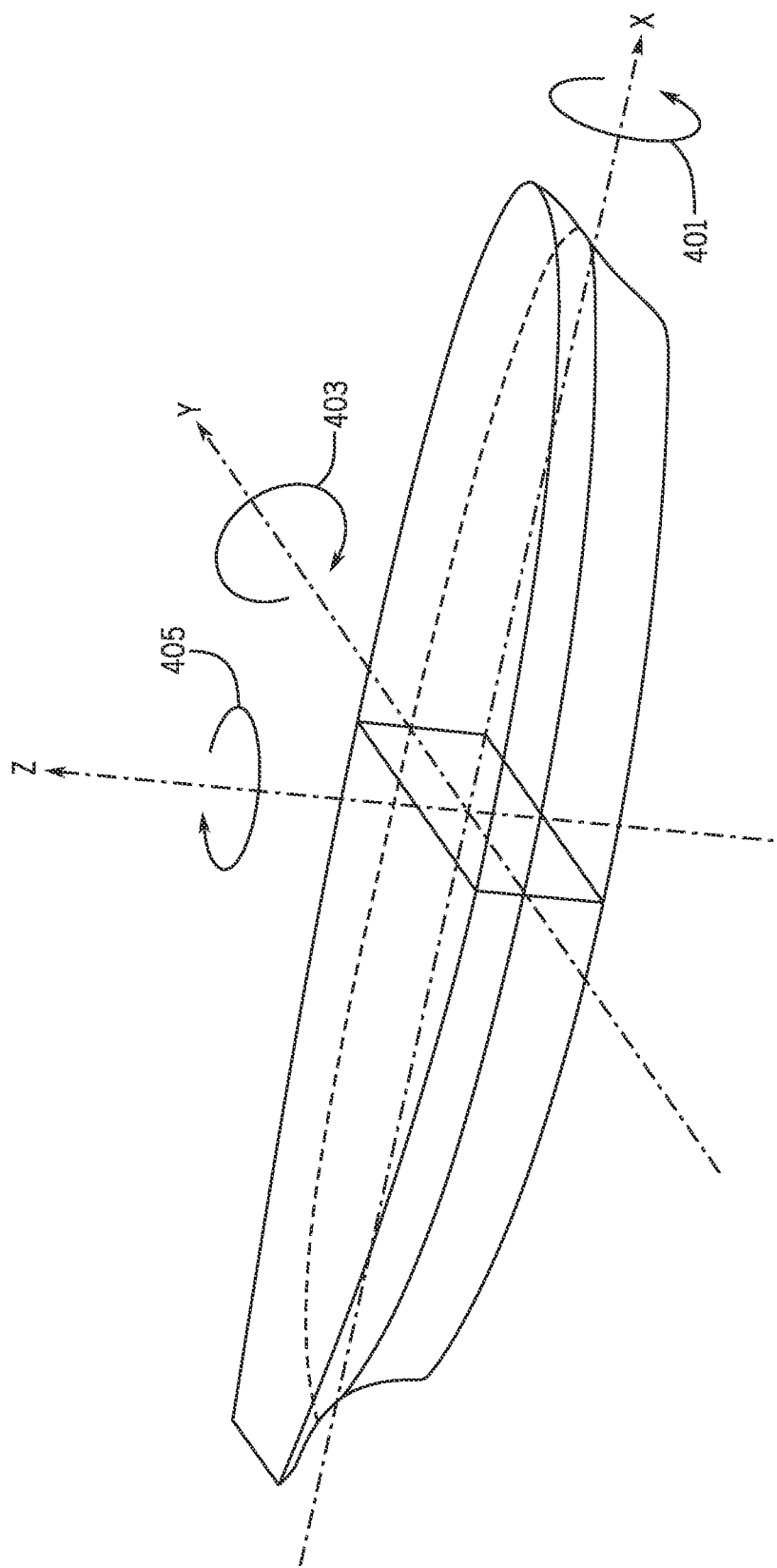
FIG. 4 illustrates a marine vessel and a coordinate system for defining movement and attitude of the marine vessel.

With reference to FIG. 4, a marine vessel's attitude can be described by its roll around an x-axis, its pitch around a y-axis, and its yaw around a z-axis. Roll angle can be calculated by an angular difference from a horizontal plane defined by the x- and y-axes. As used herein, a positive roll angle is around the x-axis in the direction of the arrow 401 shown in FIG. 4. A negative roll angle is in the opposite direction. As used herein, a positive pitch angle is around the y-axis in the direction of the arrow 403 shown in FIG. 4. A negative pitch angle is in the opposite direction. As used herein, a positive yaw angle is around the z-axis in the direction of the arrow 405, and a negative yaw angle is in the opposite direction.

Referring back to FIG. 1, the present disclosure thereby provides for a steering system 12 for controlling steering of a marine vessel 10 having first and second trim tabs 14, 16 and on or more propulsion devices 22. The system 12 comprises a control system 30 having a vessel roll controller 32 and a turn rate, or yaw rate, controller 34. The system 12 comprises first and second trim tab actuators 13, 15 in signal communication with the control system 30 that actuate the first and second trim tabs 14, 16 to first and second deployments. In one example, the first and second trim positions are percentage values of a maximum angle of deployment from horizontal. In another example, the first and second deployments are values representing the angles from horizontal or angles with respect to the bottom of the hull of the marine vessel 10. The system 12 further comprises a roll sensor Hz, such as an IMU, that provides an actual vessel roll angle to the control system 30 that can be used as feedback to control vessel roll.

The roll controller 32 compares the actual vessel roll angle to a desired vessel roll angle, and outputs a desired differential D between the first and second deployments of the first and second trim tabs 14, 16 that is calculated to place the marine vessel 10 at the desired vessel roll angle. In one example, the desired vessel roll angle is close to zero such that the marine vessel is generally level with respect to the surface of the body of water in which it is operating (i.e., is not rotated around the x-axis of FIG. 4). As indicated above, this differential deployment is usually such that the trim tab 14 or 16 on the side to which the marine vessel 10 is listing is deployed to a greater extent than the trim tab 14 or 16 on the opposite side of the marine vessel 10. The control system 30 uses feedback from the pitch/roll sensor 42 and the trim tab sensors 26, 28 in order to determine the optimal differential deployment D of the first and second trim tabs 14, 16 that will achieve the desired vessel roll angle.

Through their experimentation and research, the inventors have realized that integration of trim devices, such as trim tabs, into steering can provide a more efficient and optimized steering control. Whereas in prior art trim tab systems differential deployment is utilized to correct listing, in the disclosed systems and methods differential deployment may be utilized to intentionally induce roll in order to initiate and control vessel turn. Turn rate, or yaw rate, and vessel roll angle are connected, and their physical relationship can be described by the following equations:

$$\text{Yaw Rate} = (g/V) * \tan(\text{Roll Angle})$$

$$\text{Roll Angle} = (V/g) * \text{Yaw Rate}$$

where V represents velocity and g represents gravity. Thereby, for a given desired yaw rate, a corresponding desired roll angle can be calculated. Conversely, for a given desired roll angle, a desired yaw rate can be calculated. In certain embodiments, the steering system may utilize a vessel dynamics model, which is a computational model embodied in software and utilized by the steering controller to approximate the vessel dynamics for a particular marine vessel. Such a vessel dynamics model may be created and/or stored within the controller 30 and approximate the vessel dynamics for the marine vessel 10 based on the characteristics thereof, such as length, beam, and weight. The vessel dynamics model can be used to solve for a surge, sway, roll and/or yaw commands for controlling propulsion of the marine vessel to achieve a desired inertial velocity for the particular marine vessel. The vessel dynamics model may be utilized to implement steering control based on steering input from an operator, such as by steering wheel 38, or to implement autonomous vessel navigation (e.g., via the navigation controller 40).

In certain embodiments, the vessel dynamics model may be incorporated in a closed-loop controller where the output of the vessel dynamics model, namely the surge command, sway command, yaw and/or roll command are compared to control feedback from one or more inertial and/or navigation sensors, wherein the steering position and engine command are calculated based on the output of the vessel dynamics model as well as feedback from the sensors. Thereby, closed-loop control is effectuated over vessel translation and yaw velocities, which are computed based on feedback from a combination of sensors, such as accelerometers, gyros, magnetometers, and/or a global positioning system (GPS).

In other embodiments, the model-based control may be implemented in a feed-forward control strategy, where outputs from the vessel dynamics model are utilized to determine a steering position command and engine command for each of the plurality of propulsion devices 22. Moreover, the feed-forward strategy can be utilized as a backup control strategy in the event of a failure of one or more of the feedback sensors, thereby providing a default control state that remains very drivable and safe for a user. The engine and steering commands generated based on the output of the vessel dynamics model will result in an actual vessel velocity that is very close to the desired inertial velocity, and the feedback is only used to correct for uncertainties in the model and for wind and current. Examples of the control systems implementing vessel dynamics model are shown and described, for example, in U.S. patent application Ser. No. 16/178,261, which is hereby incorporated by reference in its entirety.

As will be understood by a person having ordinary skill in the art in light of the present disclosure, a vessel dynamics model may be utilized to generate one of a roll angle command or a yaw rate command based on a steering input, such as input at a steering wheel 38 or an output by an autonomous navigation controller 40. Corresponding yaw rate or roll angel can then be determined based on the desired values associated with the steering input, so that holistic control of yaw and roll can be effectuated during a turn maneuver.

Figure 5:
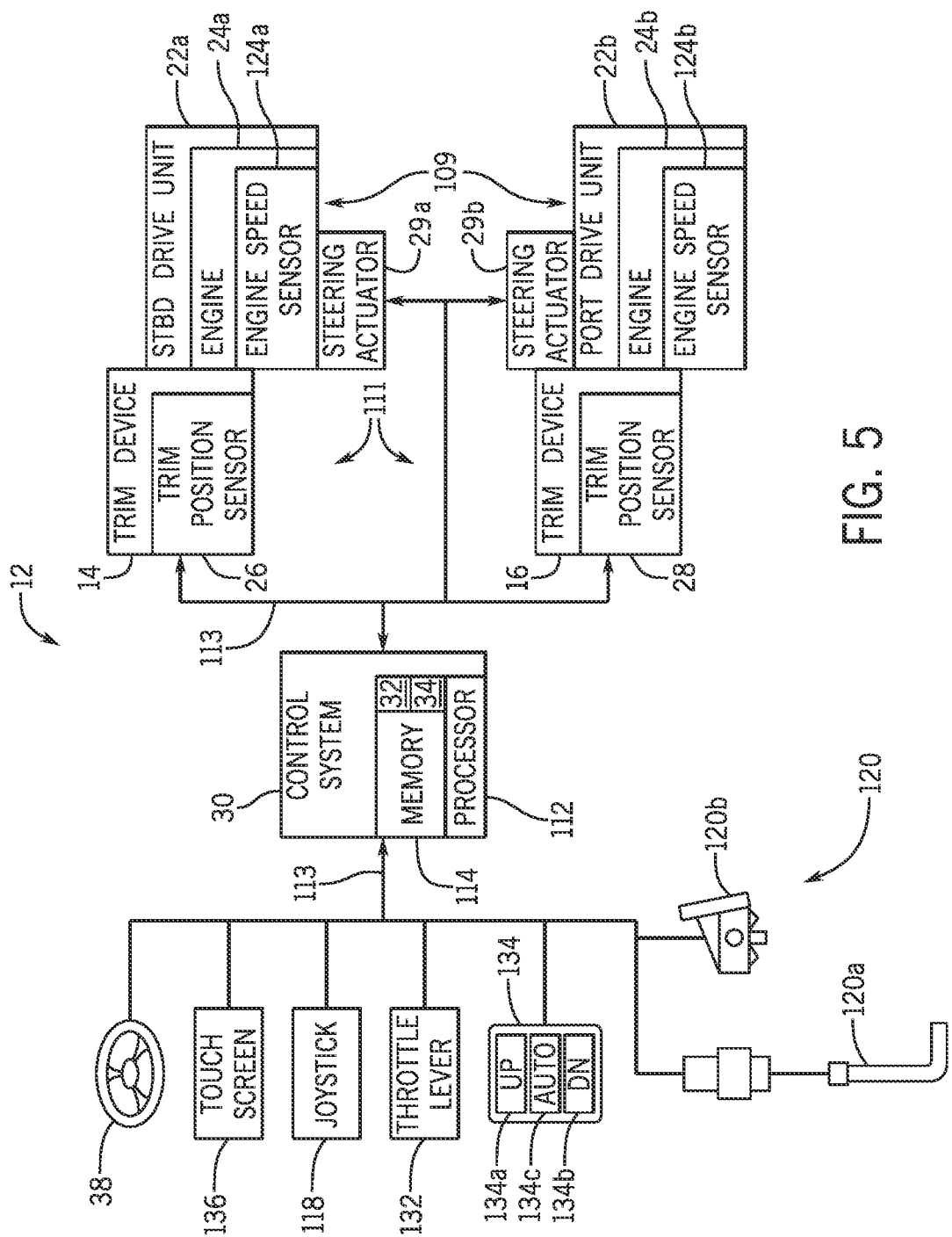
FIG. 5 schematically depicts one embodiment of a system for controlling steering via movement of both trim devices and propulsion devices.

FIG. 5 schematically depicts an embodiment of a steering control system 12 for carrying out the steering control methods described herein. Although the specific devices and connections between the devices shown in FIG. 5 depict a system having two propulsion devices 22a and 22b, which may be outboard motors, stern drives, etc., it should be understood that the steering control system may employ only one propulsion device and/or could employ more than two propulsion devices. Similarly, the system depicted in FIG. 5 employs two trim devices, which in an exemplary embodiment are trim tabs 14 and 16, it will be understood by a person having ordinary skill in the art that other trim devices may be utilized and that multiple trim devices may utilized simultaneously or effectuating and controlling roll of the marine vessel 10.

In one example, the steering control system 12 includes a controller 30 that is programmable and includes a processor 112 and a memory 114. The controller 30 can be located anywhere on the vessel 10 or located remote from the vessel 10 and can communicate with various components of the marine vessel via wired and/or wireless links, as will be explained further herein below. Although FIG. 5 shows a single controller 30, the steering system 12 can include more than one processing device, as described above. In some examples, the controller 30 may include a computing system that includes a processing system, storage system, software, and input/output (I/O) interfaces for communicating with devices such as those shown in FIG. 5. The processing system loads and executes software from the storage system, such as software programmed with a trim control method. When executed by the computing system, steering control software directs the processing system to operate as described herein below in further detail to execute the trim control method. The computing system may include one or many application modules and one or more processors, which may be communicatively connected. The processing system can comprise a microprocessor (e.g., processor 112) and other circuitry that retrieves and executes software from the storage system, including software for implementing the roll controller 32 and the turn rate controller 34.

In this example, the controller 30 communicates with one or more components of the trim system 111 and the propulsion system 109 via a communication link 113, which can be a wired or wireless link. The controller 30 is capable of monitoring and controlling one or more operational characteristics of the trim system 111 and the propulsion system 109 and their various subsystems by sending and receiving control signals via the communication link 113. In one example, the communication link 113 is a controller area network (CAN) bus, such as a CAN Kingdom Network, but other types of links could be used. It should be noted that the extent of connections of the communication link 113 shown herein is for schematic purposes only, and the communication link 113 in fact provides communication between the controller 30 and each of the sensors, devices, and various subsystems described herein, although not every connection is shown in the drawing for purposes of clarity.

As mentioned, the controller 30 receives inputs from several different sensors and/or input devices aboard or coupled to the marine vessel. For example, the controller 30 receives a steering input from a joystick 118 and/or a steering wheel 38. The controller 30 is provided with an input from a vessel speed sensor 120. The vessel speed sensor 120 may be, for example, a pitot tube sensor 120a, a paddle wheel type sensor 120b, or any other speed sensor appropriate for sensing the actual speed of the marine vessel. Alternatively or additionally, the vessel speed may be obtained by taking readings from a GPS device, which calculates speed by determining how far the vessel has traveled in a given amount of time. The propulsion devices 22a and 22b are provided with rotational speed sensors 124a, 124b, such as but not limited to tachometers that determine a speed of the engines 24a, 24b or other type of powerhead powering the propulsion devices 22a, 22b in rotations per minute (RPM).

Other inputs can come from operator input devices such as the throttle lever 132, a keypad 134, and a touchscreen 136. The throttle lever 132 allows the operator of the marine vessel to choose to operate the vessel in neutral, forward, or reverse, as is known. The keypad 134 can be used to initiate or exit any number of control or operation modes or to make selections while operating within one of the selected modes. In one example, the operator input device such as the keypad 134 comprises an interface having at least a "trim up" input 134a, a "trim down" input 134b, and an "auto-trim on/resume" input 134c, shown herein as buttons. (In some systems, these input choices are labeled "bow down" and "bow up" and command movement of the trim tabs or drive units that results in such attitude adjustment.) The controller 116 operates the trim system 111 in the manual mode in response to selection of one of the "trim up" input 134a and "trim down" input 134b. For example, a trim up command will actuate the trim device to trim the trim tab or drive unit up, while a trim down command will actuate the trim device to trim the trim tab or drive unit down. On the other hand, the controller 30 may operate the trim system 111 in an automatic mode as described herein, which may be, for example, in response to selection of the "auto-trim on/resume" input 134c.

The touchscreen 136 can also be used to initiate or exit any number of control or operation modes (such as trim up, trim down, or auto-trim mode), and in that case the inputs can be buttons in the traditional sense or selectable screen icons. The touchscreen 136 can also display information about the trim system 111 and/or the propulsion system 109 to the operator of the vessel, such as engine speed, vessel speed, trim angle, trim operating mode, propulsion system operating mode, etc.

Figure 6:
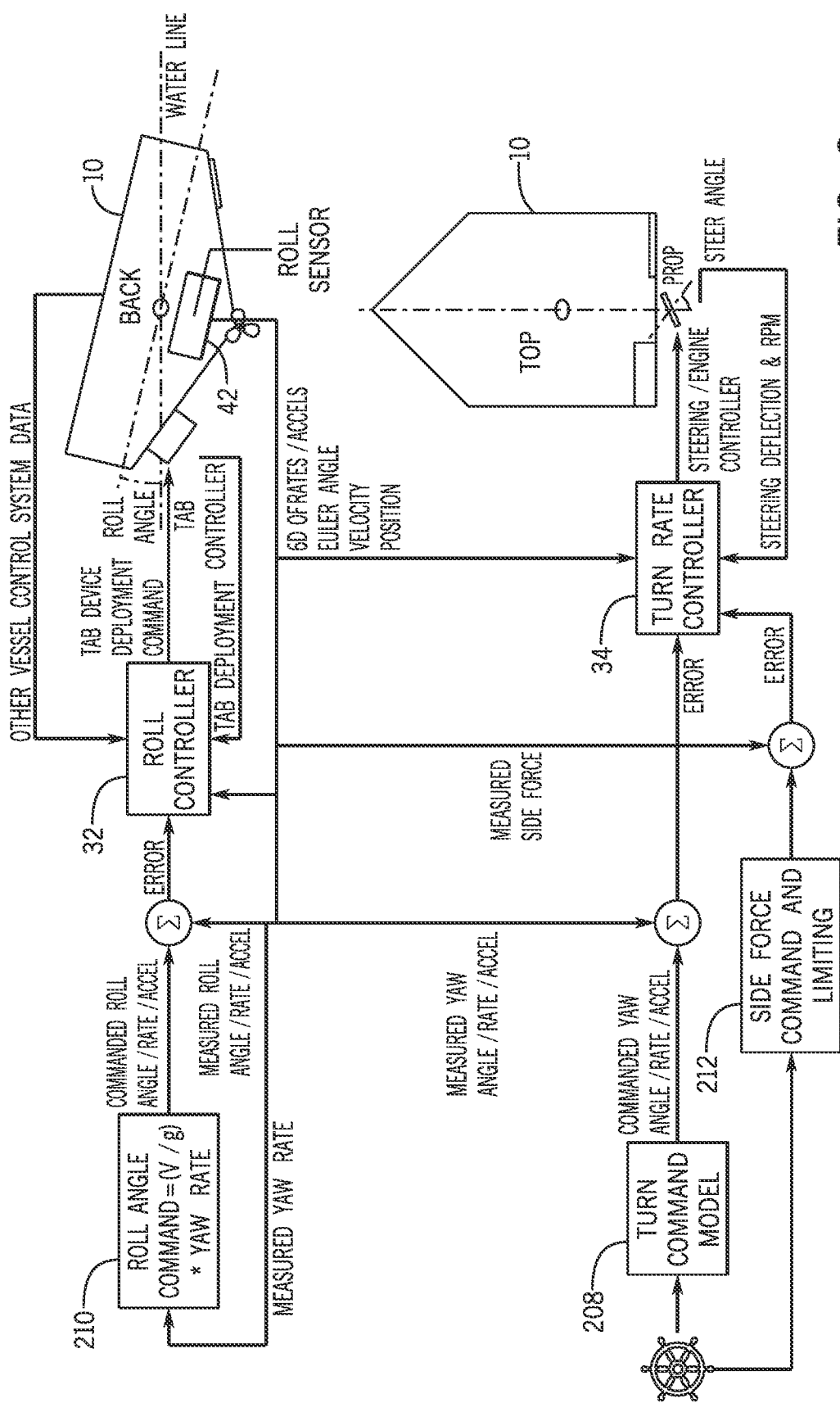
FIG. 6 is a control diagram depicting one embodiment of a method of controlling steering of a marine vessel according to the present disclosure.
Figure 7:
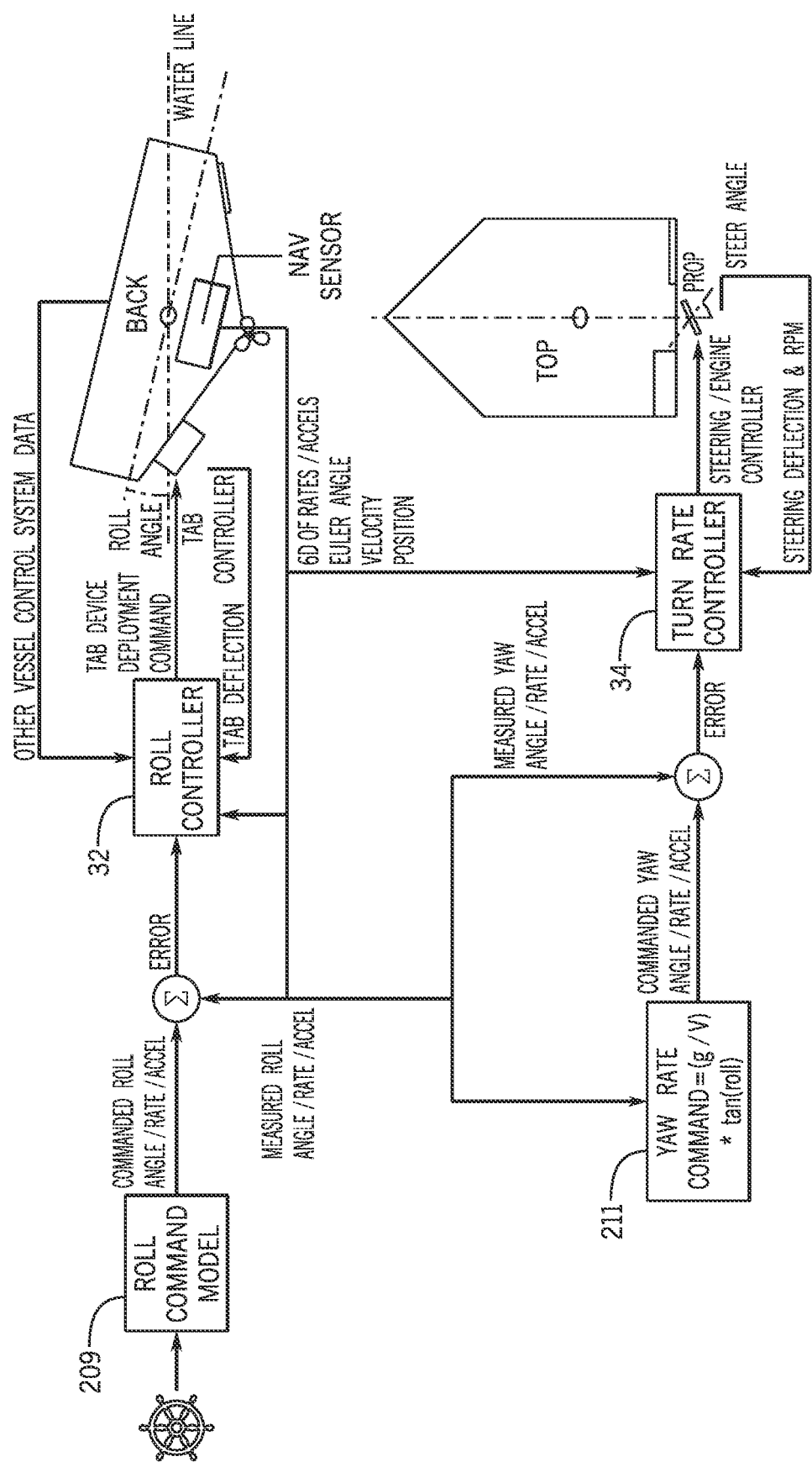
FIG. 7 is a control diagram depicting another embodiment of a method of controlling steering of a marine vessel according to the present disclosure.

FIGS. 6 and 7 provide control schematics that diagrammatically represent embodiments of steering control methods described herein providing integrated roll and yaw rate control. In FIG. 6, desired yaw rate dynamics are calculated at the turn rate command model 208. The turn rate command model 208 calculates a desired turn rate and turn angle based on the steering wheel input from the steering wheel 38. For example, the turn rate command model 208 may be generated based on or implement a vessel dynamics model for a particular marine vessel, as described above. Thus, movement of the steering wheel is associated with how fast the boat will turn, rather than correlating steering input with steering angle, or angle of the propulsion device(s) 22. Thereby, the turn command model 208 accounts for vessel speed and creates a constant turn rate feel on the wheel. For example, the propulsion device 22 may rotated more quickly when the vessel 10 is at lower speeds than when the vessel 10 is at higher speeds based on the same steering wheel input 38 so as to effectuate the same turn rate based on the steering wheel input at both high and low vessel speeds. Alternatively or additionally, in embodiments where the marine vessel is equipped with autonomous navigation, the autonomous navigation controller 40 may be configured to provide a turn rate command as input to the controller 30. In embodiments where the marine vessel is equipped with autonomous navigation, the autonomous navigation controller 40 may be configured to provide a turn rate command to the controller 30 to initiate the turn. The desired roll angle will then be calculated as described herein.

A corresponding desired roll angle is calculated at the desired yaw rate, which is performed at the roll angle calculator 210. Specifically, the role angle calculator 210 calculates a coordinated roll angle for the given desired turn rate, where the coordinated roll angle is the angle in roll for the marine vessel that will yield 1G during the turn. Thereby, the desired roll angle that correlates with the desired turn rate demanded by the operator (or by the autonomous navigation control) will be calculated up to the maximum turn rate for the marine vessel 10. The desired roll angle is then provided to the roll controller 32 which controls the trim device, such as the trim tabs, to effectuate the desired roll angle. The roll controller 32 may be, for example, a proportional-integral-derivative (PID) controller, an optimal controller, or another type of tracking loop controller. In the depicted embodiment, the roll controller 32 communicates to the corresponding tab controller to deploy the trim tabs as appropriate to effectuate the desired roll angle. Position sensors 26, 28 sense the position of the trim device, such as the trim tab, and provide such measurement as feedback to the roll controller 32. Roll sensor 42 senses the roll position of the marine vessel 10 and provides such information as feedback to the roll controller 32. Thereby, the roll of the marine vessel is controlled in a feedback control loop as part of a coordinated steering control. Thus, rather than allowing roll angle to naturally occur as a result of steering, which may not be the optimal roll angle for maximizing steering, the disclosed steering control system controls roll of the marine vessel in order to optimize turn efficiency.

In the depicted example, the steering control method implements a side force limiter 212 which calculates the side force command for a given turn rate and roll angle and determines whether the side force resulting from the desired turn rate and desired roll angle is greater than a side force limit. Lateral side forces are undesirable because they create uncomfortable and even dangerous situations for passengers and operators of marine vessels. If side forces are excessive, passengers and operators can be thrown off the marine vessel due to an overly aggressive turn. Side forces result where the roll of the marine vessel 10 does not align with the turn so that the marine vessel can be positioned to absorb all of the centripetal force. Ideally, the lateral side force, or side force perpendicular to the vertical axis z through the marine vessel, is zero, or close thereto. This is effectuated by rolling the marine vessel to the angle necessary to counteract the centripetal force of the turn.

In certain embodiments, a lateral side force limit may be set based on comfort, safety, or both to limit the amount of side force that can result from turning the marine vessel. The side force limiter 212 may limit how fast the marine vessel turns, limiting the yaw rate, in order to prevent the lateral side force from exceeding the predetermined side force limit. For many marine vessels, the trim system, such as the trim tabs, may not have enough authority to create a coordinated bank angle for all commanded turn rates. Thus, the side force limiter can act as a turn rate limiter implemented to prevent the operator from over steering the boat and creating forces that could be a safety concern, or even skip or slide the vessel 10. In certain embodiments, the sensed roll position by the roll sensor 42 may be provided to ensure that the actual lateral side forces do not exceed the preset limit. The side force calculation may account for the limits of the trim system (such as the tab deflection authority), the limits of the propulsion steering system (such as steering angle and rate limits), the roll angle limits of the marine vessel, etc. Based thereon, the side force limiter 212 may effectuate a maximum turn rate that will prevent a turn rate command producing lateral side forces that exceed the limits. To provide just one example, the side force limiter 212 may have a preset maximum permitted turn rate that can be effectuated by the turn rate controller 34 controlling the steering and propulsion system.

The desired turn rate is provided to the turn rate controller 34, which then controls the steering actuators 29a and 29b for the propulsion devices 22a and 22b. In various embodiments, the turn rate controller 34 may be a PID, an optimal controller, or another tracking loop controller. The turn rate controller 34 may also be configured to control engine speed of the engines 24a and 24b of one or more propulsion devices 22a, 22b in order to effectuate steering. For example, engine speed (or rotational speed of the powerhead of the propulsion device 22a, 22b) may be increased or decreased in order to provide another axis of control of the roll angle and yaw rate of the marine vessel 10. The turn rate controller 34 may receive feedback from various sensors associated with the steering and propulsion system, including a steering angle sensor associated with one or more steering actuators 29a, 29b, one or more rotational speed sensors 124a, 124b, etc. Thereby, the turn rate controller 34 can effectively control steering deflection, and in certain embodiments engine speed or engine output, of the propulsion system 109.

FIG. 7 depicts another embodiment of a control system and method where the steering input is associated with a roll angle, as well as a roll rate and/or a roll acceleration. In particular, the roll command model 209 is utilized to compute the roll angle associated with the steering input, e.g. from steering wheel 38. In embodiments where the vessel is equipped with an autonomous navigation controller 40, the autonomous navigation system may be configured to provide a roll angle command for initiating a turn. The coordinated yaw rate will then be calculated at the yaw rate calculator 211. Thereby, the desired turn rate will be determined based on the desired roll angle provided by the roll command model 209. The roll controller 32 and turn rate controller 34 then operate as described herein to provide a coordinated turn at the desired roll angle and the desired turn rate.

In certain embodiments, a combination or hybrid of the roll command model and the turn rate command model systems shown at FIGS. 6 and 7 may be implemented, where both the desired roll and the desired turn rate are calculated based on steering input. Various embodiments are available to provide integrated heading and roll control in accordance with the purposes and implementations described herein. Such steering control systems provide safe and effective steering control, but also provide effective vessel stabilization when a turn is not commanded and the boat is being driven straight ahead. Namely, if the steering command does not construct a turn—the turn rate is zero, for example—then the vessel will be controlled so that the roll angle of the marine vessel is also zero and the marine vessel is maintained horizontal with the water line. Thus, if the marine vessel begins to list while the vessel is being steered straight ahead, the disclosed steering system will automatically correct the listing. Similarly, if the vessel 10 begins to chine walk while the marine vessel is being steered straight ahead, the trim system will automatically engage to maintain the marine vessel in the horizontal position.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A steering system on a marine vessel, the steering system comprising:
   at least one trimmable propulsion device configured to propel the marine vessel;
   for each of the at least one trimmable propulsion device, a steering actuator configured to rotate the at least one trimmable propulsion device to a steering position and a propulsion device trim actuator configured to move the propulsion device about a trim axis to a propulsion trim position;
   a pair of trim tabs each configured to be actuatable by a pair of trim tab actuators to first and second trim tab positions;
   a control system configured to:
      receive a steering instruction;
      determine a desired roll angle and at least one of a desired turn rate and desired turn angle for the marine vessel based on the steering instruction;
      determine the steering position, the propulsion trim position, and the first and second trim tab positions based on the desired roll angle and the at least one of the desired turn rate and/or the desired turn angle; and control the steering actuator to effectuate the steering position, control the propulsion device trim actuator to effectuate the propulsion trim position, and control the pair of trim tab actuators to effectuate the first and second trim tab positions so as to effectuate the steering instruction.

2. The steering system of claim 1, wherein the control system includes a roll controller configured to:
receive the desired roll angle for the marine vessel; and
control the propulsion trim position of the trimmable propulsion device and/or the first and second trim tab positions of the pair of trim tabs to maintain the desired roll angle.

3. The steering system of claim 2, wherein the roll controller is further configured to adjust the first and second trim tab position to maintain the desired roll angle.

4. The steering system of claim 2, wherein the roll controller is further configured to adjust the propulsion trim position and the first and second trim tab position to maintain the desired roll angle.

5. The steering system of claim 1, wherein the control system is further configured to:
determine a predicted lateral side force based on the steering instruction and at least one of the desired roll angle and a maximum roll angle of the marine vessel; and
determine the steering angle and/or the propulsion trim position for the at least one outboard drive based on the desired turn rate the predicted lateral side force.

6. The steering system of claim 5, wherein the control system is further configured to compare the predicted lateral side force to a side force limit and determine the steering angle and/or the propulsion trim position for the at least one trimmable propulsion device based on the desired turn rate and the comparison of the predicted lateral side force to the side force limit.

7. The steering system of claim 5, wherein the control system further includes a turn rate controller configured to:
receive vessel motion information from a motion sensor on the marine vessel; and
control the steering actuator based on the desired turn rate, the desired turn angle, the vessel motion information, the predicted side force, and the side force limit so as to prevent an actual lateral side force from exceeding the side force limit.

8. The steering system of claim 5, wherein the control system is further configured to determine at least one of the trim position of the trimmable propulsion device and a rotational speed of the trimmable propulsion device to effectuate the desired turn rate and/or the desired roll angle without exceeding a side force limit.

9. The steering system of claim 1, wherein the control system is further configured to:
determine the desired turn rate from the desired roll angle; and
determine the propulsion trim position and the first and second trim tab positions to effectuate the desired roll angle and determine the steering position of the trimmable propulsion device to effectuate the desired turn rate.

10. A method of controlling steering of a marine vessel, the method comprising:
receiving a steering input from an operator-controlled steering input device;
determining a desired turn rate for the marine vessel and a desired roll angle for the marine vessel based on the steering input; and
controlling a steering angle of at least one trimmable propulsion device based on the desired turn rate and controlling a trim deployment of a pair of trim tabs and/or the trimmable propulsion device based on the desired roll angle to steer the marine vessel according to the steering input.

11. The method of claim 10, wherein controlling the trim deployment includes controlling a propulsion trim position of the at least one trimmable propulsion device and a trim tab position of each of the pair of trim tabs based on the desired roll angle.

12. The method of claim 10, wherein the desired turn rate is determined based on the steering input, and further comprising determining at least the trim deployment of each of the pair of trim tabs to effectuate the desired roll angle and determining a steering angle command for the at least one trimmable propulsion device to effectuate the desired turn rate.

13. The method of claim 10, wherein the desired roll angle is determined based on the steering input, and further comprising:
determining the desired turn rate from the desired roll angle; and
determining the trim deployment of each of the pair of trim tabs and/or the trimmable propulsion device to effectuate the desired roll angle and determining a steering angle command of the at least one propulsion device to effectuate the desired turn rate.

14. The method of claim 10, further comprising:
determining a predicted lateral side force based on at least the steering input and/or a maximum roll angle of the marine vessel; and
determining a steering angle command to control a steering actuator based on the desired turn rate and the predicted lateral side force.

15. The method of claim 14, further comprising:
receiving vessel motion information from a motion sensor on the marine vessel; and
controlling the steering actuator based on the desired turn rate, the desired turn angle, the vessel motion information, the predicted lateral side force, and the side force limit to prevent an actual lateral side force on the marine vessel from exceeding the side force limit.

16. A method of controlling steering of a marine vessel, the method comprising:
based on a desired turn rate, calculating a desired roll angle for the marine vessel;
determining a trim deployment of each of a pair of trim tabs and a propulsion trim position of at least one trimmable propulsion device based on the desired roll angle; and
controlling a steering angle of the at least one trimmable propulsion device based on the desired turn rate and controlling a plurality of trim actuators to move each of the pair of trim tabs to the trim deployment and to move the trimmable propulsion device to the propulsion trim position to effectuate the desired turn rate.

17. The method of claim 16, further comprising receiving vessel motion information from a motion sensor on the marine vessel, and then utilizing the vessel motion information as feedback for controlling the trim deployment of the pair of trim tabs.

18. The method of claim 16, further comprising determining a rotational speed of a powerhead based on the desired turn rate and controlling the at least one trimmable propulsion device based on the rotational speed to effectuate the desired turn rate.

19. The method of claim 16, further comprising:
controlling a steering actuator and the plurality of trim actuators based on the desired turn rate so as not to exceed a side force limit.

20. The method of claim 19, further comprising:
determining a predicted lateral side force based on the desired turn rate and at least one of the desired roll angle and a maximum roll angle of the marine vessel;
comparing the predicted lateral side force to the side force limit; and
determining a steering angle command and a desired trim deployment of each of the pair of trim tabs to the desired trim deployment based on the comparison so as not to exceed the lateral side force limit.

21. The method of claim 16, the desired turn rate is received from an autonomous navigation controller for the marine vessel or is based on a steering input from an operator-controlled steering input device.

* * * * *